Patented Feb. 27, 1934

1,948,959

UNITED STATES PATENT OFFICE 1,948,959

COATING MATERIAL

Michele Croce, Boyer Road, Cheltenham, Pa., assignor, by mesne assignments, to Sloane-Blabon Corporation, New York, N. Y., a corporation of Delaware No Drawing. Application October 26, 1927, Serial No. 228,978. Renewed December 14, 1933

5 Claims. (Cl. 134—39)

This invention relates to coating materials such as paints, varnishes and lacquers.

One of the objects of the invention is to produce an aqueous coating material having as a constituent a solidified drying oil.

A further object of the invention is to provide a coating material which will require a very short drying time, and will, when dry, be tough and elastic.

One important feature of the present invention resides in the use of products made from drying oils such as linseed oil, China wood oil, fish oil, soya bean oil, etc., which products have heretofore not been used as ingredients in liquid coating materials using water as a vehicle.

Another feature of the invention resides in forming an emulsion of such materials.

In accordance with the present invention various drying oils such as boiled or raw linseed oil, China wood oil, fish oil, soya bean oil, rape seed oil or Perilla oil or mixtures of these or similar oils are solidified by any suitable method such as oxidizing or polymerizing the oil forming what is commonly known in the linoleum industry as linoxin or scrim oil, Bedford oil, or Taylor oil.

These solidified drying oils may be used by themselves or in combination with gums and resins in the form of linoleum "cements".

Each of these materials, linoxin, scrim oil, Bedford oil and Taylor oil, as well as the linoleum "cements" is practically insoluble in turpentine, benzine, benzol, naphtha, alcohol, acetone and other well known organic solvents used in the paint, varnish and lacquer industry and for this reason they have not been employed as constituents of liquid coating materials.

In general, these products are made by the process of oxidation, polymerization or a combination of oxidation and polymerization of the various drying oils well known in the paint, varnish and linoleum industry. The process of oxidation and polymerization is carried to such an extent that the resulting products attain a solid or semi-solid consistency at ordinary temperature and do not revert to the liquid state on heating. I regard oil as solidified when the cooled product has no tendency to run off from a spatula at 70° F.; it may, however, still have some capacity for plastic flow. The extent to which the oxidation or polymerization is carried renders the products insoluble or difficultly soluble in ordinary solvents common to the paint, varnish and lacquer industries. The insolubility of these drying oil products in the various organic solvents has precluded their use in the manufacture of paints, varnishes and other coating materials.

In the present invention a tough, quick drying coating material is produced using these solidified drying oil products or linoleum "cements" or mixtures of these materials by mixing the materials with water to produce a colloidal solution or emulsion of the material in a readily vaporizable liquid. The resulting product forms an excellent vehicle which may be used by itself or with other materials as a varnish or lacquer or which may be mixed with pigments to produce a paint. A coating material thus made consists essentially of water and the solidified drying oil product which is relatively insoluble in turpentine, benzine or benzol. The coating material thus produced hardens practically as soon as the volatile constituent has evaporated leaving a coating of solidified oil.

Although vegetable oil emulsion paints are common in the art they are ordinarily prepared by using oils or fatty bodies which are viscous liquids at ordinary temperatures but revert to liquids of low viscosity at higher temperatures and are soluble in the ordinary organic solvents well known in the paint, varnish and lacquer industry. Furthermore these emulsion paints harden after the water is evaporated by the oxidation of the oil vehicle and for this reason require considerably more time to harden the film than is necessary for the hardening of coating material of the character set forth in the present application wherein the oil product is already oxidized or polymerized, etc., to a very large extent.

The coating materials produced in accordance with the present invention differ from previous water emulsion paints in that they include as a constituent solidified drying oils and for this reason coating materials containing these substances harden practicaly as soon as the volatile constituent of the emulsion has evaporated leaving a coating of oxidized or polymerized oil. Furthermore, the drying oil products are solids or semi-solids at ordinary temperatures and do not revert to the liquid state on heating.

These substances are not soluble in the ordinary organic solvents used in the paint, varnish and lacquer industry and as a result of this insolubility such coating materials are of particular advantage for use upon materials which are to any extent soluble in drying oils or the organic solvents. An example of this use of such coating materials is in the felt base floor covering industry in which asphalt impregnated felt is coated with various coating materials, in order to seal the asphalt saturant so that it will not discolor the subsequent enamel coating which forms the decorative design of the floor covering. It is essential that the coating used to seal the asphalt saturant be elastic. Heretofore, coating materials, either of the emulsion type or of the organic solvent type, used for this purpose, had, of necessity, to contain a relatively large amount of drying oil in order to obtain this elasticity and therefore required anywhere from three to twelve hours to harden at a temperature from 120 to 140° F. A coating material made according to the present invention, when applied to asphalt impregnated felt, such as used in the felt base floor covering industry, will harden almost as soon as the volatile constituent has evaporated. Moreover, this coating material may be applied to wet or damp surfaces, since any moisture in the surface which is coated combines with the vehicle of the coating material and evaporates with it.

Another advantage of using a coating material made according to this invention is that these solidified oils have no solvent action whatever on the asphalt saturant contained in the felt, while coating materials of the emulsion type or the organic solvent type made according to past experience, because they contain liquid oils, do exert some solvent action on the saturant and retard the hardening process of the residual coating material film.

A further advantage in using the coating material made according to this invention is that a relatively large portion of these solidified oils can be used as constituents and produce a very tough and elastic film without increasing the drying time or curing time of the residual coating material film. With the ordinary drying oil used in the manufacture of paints and varnishes, it is necessary in order to obtain a more elastic residual film to increase the ratio of the oil to pigments with the result that the drying time is materially increased.

As an example of the process, 1000 parts of any of the above-mentioned solidified oil products are ground to a plastic mass by means of a suitable roller grinder or other grinding equipment. The material is then placed in a steam or water jacketed masticator or dough mixer and 200 parts of rosin added and mixed until the rosin is thoroughly incorporated into the compound. 10 parts of an emulsifying or colloidal agent such as casein, bentonite, or any other colloidal clay, soap, sulphonated oil or any other emulsifying agent is added and thoroughly mixed with the compound. If the emulsifying agent is to be soap it can be prepared as an incidental reaction in the process while the materials are being mixed by adding 10 parts of caustic soda to the mixture. The materials are kept mixing in the masticator and 500 parts of water are added in increments of 50 parts each until the mass is in colloidal solution or suspension. If the material is to be used as a paint 1000 parts of pigment are then added and when thoroughly incorporated 200 parts more of water is mixed into the product to produce the proper paint consistency.

The pigment used can be of any of the natural or chemical pigments well known in the paint industry and the resulting product may be used directly as a paint or coating material of wide application.

It is not to be understood that the invention is limited by the proportions given in the specific example cited nor is it essential that the oils be solidified by oxidation or polymerization but other methods of solidifying of the oils may be employed. The term "linoxyn" has been chosen with this in view, and is used in its broad sense as commonly accepted in the industry to describe the rubbery protective substance obtained by solidifying a drying oil, whether by oxidation or polymerization, or other process or combination of processes used in the art for producing a satisfactorily dried product of such nature.

The term "emulsion" as used in the specification and claims has been employed to simplify the disclosure but it is intended that the term should include all degrees of dispersion independently of whether the constituents or any of them are strictly in molecular or colloidal solution or in suspension as defined in the strict sense of physical or colloid chemistry.

What is claimed as new is:

1. The method of making a coating material which comprises the solidifying of drying oil by oxidation and polymerization and dispersing the solidified oil in an aqueous vehicle.

2. A liquid coating composition comprising a solidified oxidized and polymerized drying oil dispersed in an aqueous vehicle.

3. A liquid coating composition comprising solid linoxyn dispersed in an aqueous vehicle.

4. A liquid coating composition comprising solidified oxidized and polymerized China wood oil dispersed in an aqueous vehicle.

5. A liquid composition as defined in claim 2, in which a resin is dispersed in the solidified oil.

MICHELE CROCE.